United States Patent [19]

Hart-Smith

[11] Patent Number: 5,297,760
[45] Date of Patent: Mar. 29, 1994

[54] AIRCRAFT SKIN LAP SPLICE

[75] Inventor: Leonard J. Hart-Smith, Long Beach, Calif.

[73] Assignee: McDonnell Douglas Corporation, Long Beach, Calif.

[21] Appl. No.: 933,255

[22] Filed: Aug. 21, 1992

[51] Int. Cl.⁵ ............................................. B64C 1/12
[52] U.S. Cl. ................................... 244/132; 244/131; 403/41
[58] Field of Search ................... 244/131, 132, 117 R, 244/119; 403/41; 52/462, 582

[56] References Cited

U.S. PATENT DOCUMENTS 2,639,788  5/1953  Korsberg et al. .................. 244/131

FOREIGN PATENT DOCUMENTS 1574931  6/1990  U.S.S.R. ............................... 403/41

Primary Examiner—Michael S. Huppert
Assistant Examiner—Anne E. Bidwell
Attorney, Agent, or Firm—Max Geldin

[57] ABSTRACT

Fuselage skin lap splice for aircraft formed of metal or composite skin panels. The adjacent skin panels comprise an outer skin and an inner skin, having contacting overlapping longitudinal edge portions, and a plurality of fasteners connecting such overlapping edge portions. A plurality of outwardly extending fingers are integrally connected along the edge portion of the inner skin and at least one longitudinal row of fasteners passes through the fingers and connects the outer skin and the fingers. Preferably the fingers are lollipopped, that is, have one or more protrusions thereon. The fingers at the end of the inner skin are flexible and soften and the load transfer through the fasteners, reducing the peak bearing stress and increasing the fatigue life of the splice. Alternatively, the desired flexibility at the end of the inner skin can be achieved by providing a plurality of large holes near the edge of the inner skin rather than by the provision of the fingers having apertures therebetween.

20 Claims, 4 Drawing Sheets

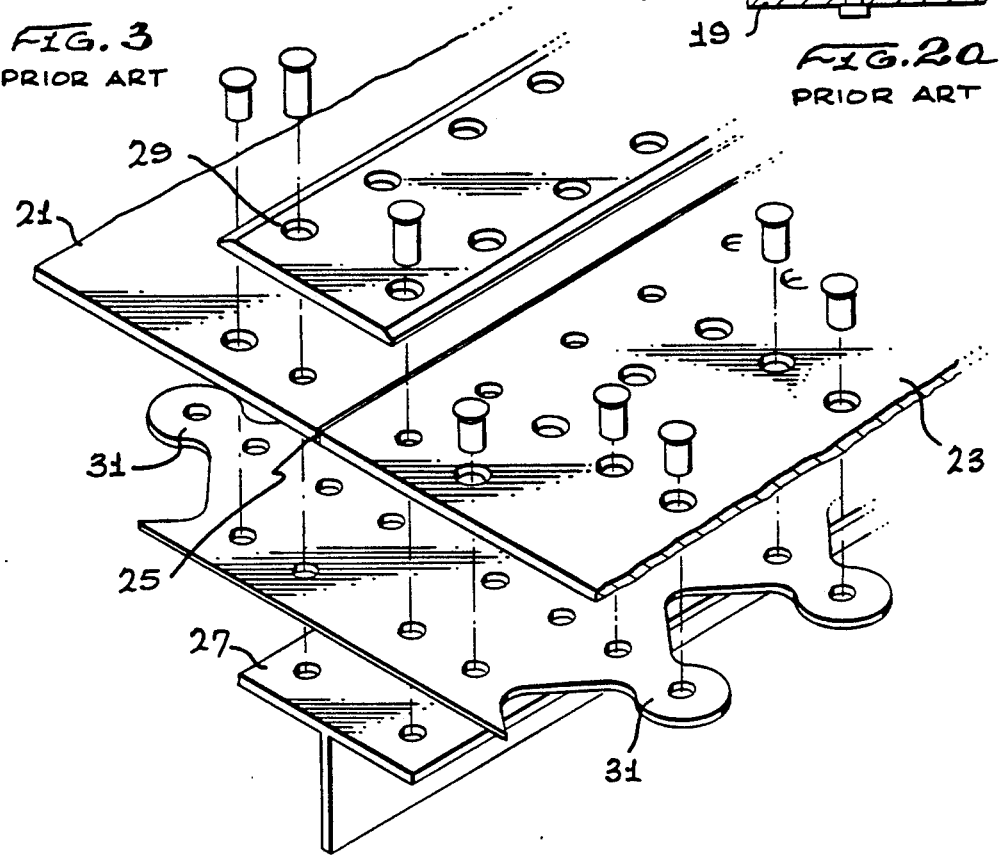
FIG. 2 PRIOR ART
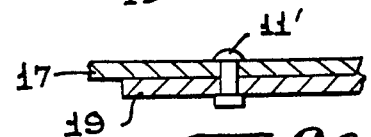
FIG. 2a PRIOR ART
FIG. 3 PRIOR ART
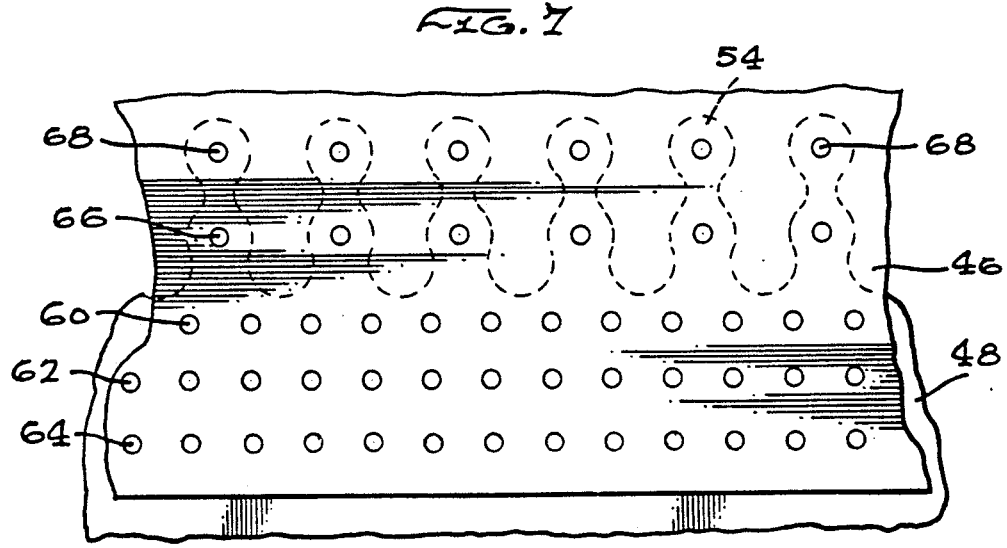
FIG. 7

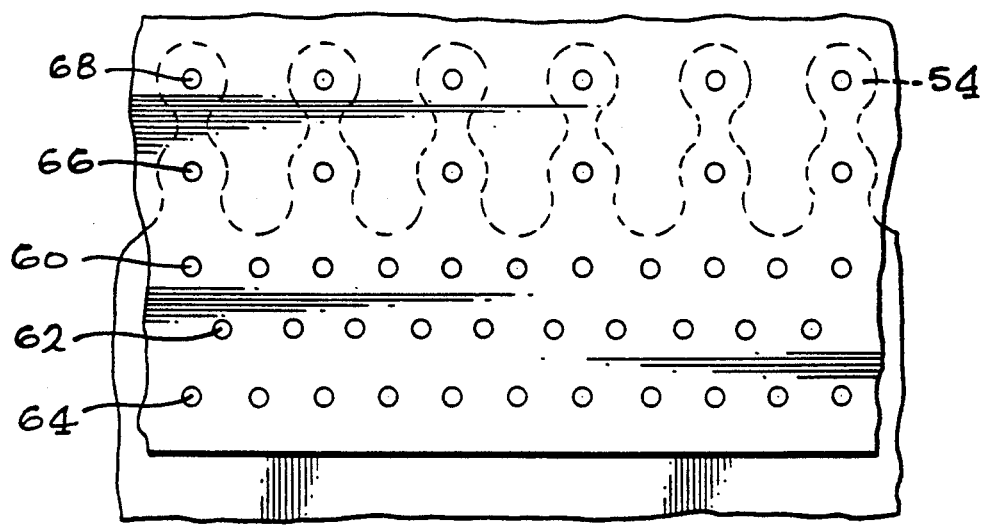
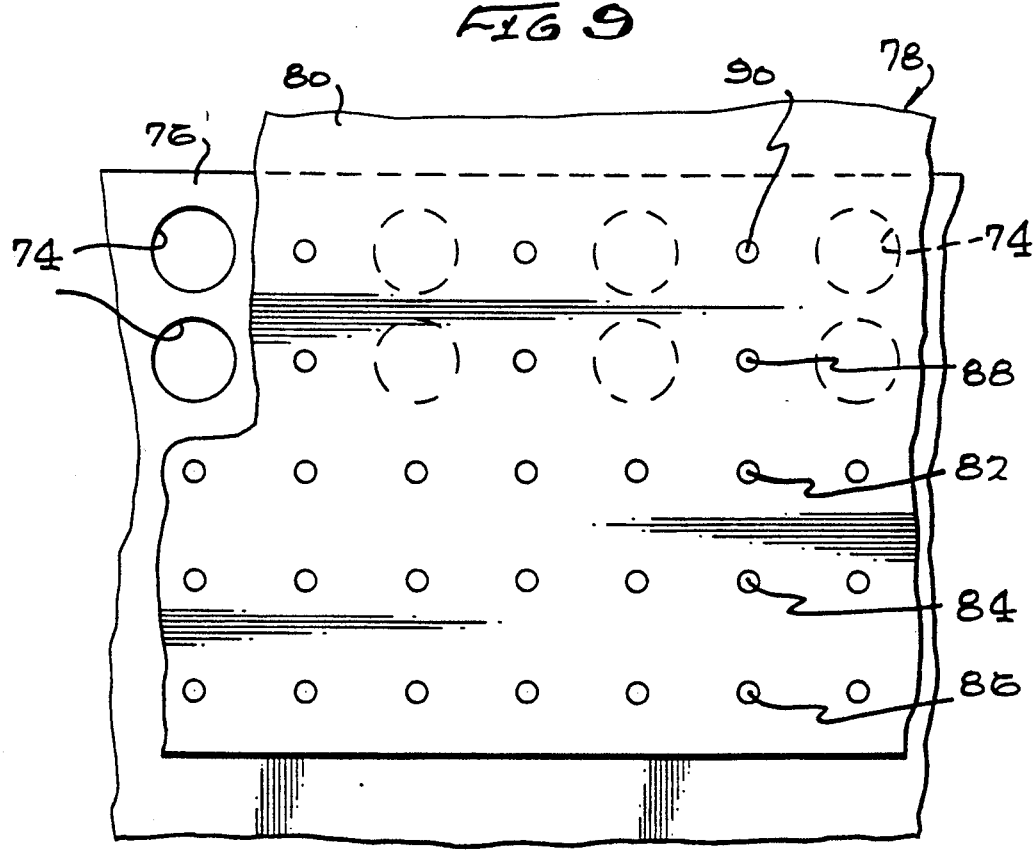

AIRCRAFT SKIN LAP SPLICE

BACKGROUND OF THE INVENTION

This invention relates to an aircraft skin lap splice between adjacent panels on an aircraft, and is particularly directed to the provision of an improved fuselage skin lap splice.

In the longitudinal fuselage skin lap joint splicing of adjacent panels on an aircraft, longitudinal rows of fasteners are used to connect the overlapping outer and inner skins. However, high load transfer occurs through the outermost rows of fasteners in such skin lap splices, resulting in high shear loads on such fasteners, and a limited fatigue life of the connection.

To overcome this problem, one or more so-called "finger doublers" are sometimes used at the skin lap splice between adjacent skin panels. One form of such prior art longitudinal skin lap splice arrangement is shown in FIG. 1 of the accompanying drawing. In this figure, numeral 10 is a longitudinal fuselage skin lap splice formed of the overlapping edge portions of an outer skin 12 and an inner skin 14 combined with a pair of finger doublers 16 and 18. The two full rows of rivets 20 and 22 are located in the overlap between the adjacent outer and inner skin portions, and the finger doublers 16 and 18 are added to decrease the critical bearing stress that would otherwise develop on such rows of rivets. The need for reducing the bearing stress exerted by the rivets on the skins is particularly pronounced for the outer skin 12 whenever the rivets are countersunk, or flush, since the parallel shank of the rivet is far more effective than the sloping head in transmitting load. Even though the rivet loads are common to both skins, the inner skin 14 is less critical because the full thickness is available to withstand the bearing loads on each rivet.

The finger doubler 16 at the top picks up one of the full rows of rivets 20 between the outer and inner skins, along the row of holes at 24 and the row of rivets at 26 which pass at 28 through the fingers 30 of the doubler 16. The lower finger doubler 18 fits inside the inner skin 14 and picks up all of the fasteners in rows 20 and 22 in holes 32 and 34, and also picks up all of the fasteners in row 36 of the inner skin 14, in the row of holes 38 of the fingers 40. Rows 26 and 36 contain holes spaced twice as far apart as in rows 20 and 22. The longeron 42, which functions to stabilize the splice or connection against buckling, is connected to the skins 12 and 14 and doubler 18 by the line of fasteners through the row of holes 34 in the inner skin, matching row 22 in the outer skin.

The term "fastener" is sometimes used generically to refer to all fasteners including, for example, bolts, rivets and pin-collar combinations. Aircraft joints can contain a mixture of threaded fasteners and rivets at different locations within the same joint, depending on the local load transfer. In the present invention the word fastener is used in its generic sense, and the word rivet is used to illustrate specific examples.

A simpler but less durable form of prior art lap splice is shown in FIG. 2, consisting of three (or sometimes two or four) full rows of fasteners 11, 13 and 15 through a uniformly wide overlap. The critical location is at the countersunk holes around the rivets 11 in the outer skin 17 nearest to the end of the inner skin 19. The holes at the opposite end of the splice are less critical because the continuous (inner) skin is not countersunk there. The full thickness of the skin is available to react the bearing stress due to the loads on fasteners 15 and to transmit the "bypass" load to the other fastener rows. Although the fastener loads peak at both ends of the overlap in FIG. 2, the holes adjacent to the end of the outer skin are less critical than at the opposite end because the load in the outer skin has been decreased by the loads transmitted by the other rows of fasteners. For the same reason, the inner skin 19 is more critical at the fastener row 15 than it is at row 11. The fatigue life of such a simple splice has sometimes been increased by using a row of protruding-head fasteners as shown at 11' in FIG. 2a for only the most critical row, in an otherwise flush joint. This local modification improves the fatigue life of the joint by decreasing the bearing stress in the outer skin 17 by having the entire thickness of the skin available to resist the bearing loads transmitted by fasteners 11', in contrast with only the parallel shank depth in FIG. 2. The difference is the depth of the countersink in the row of holes for the fasteners 11 in FIG. 2. The modified joint in FIG. 2a is now equally critical in the outer skin 17 at the row of fasteners 11' and in the inner skin at the row of fasteners 15 (see FIG. 2). While the fatigue life has been increased with respect to the flush joint shown in FIG. 2, the 50—50 likelihood of the cracks occurring where they would be visible from the outside and where they would not is a significant disadvantage. Also, the protruding head fasteners 11' in FIG. 2a will add to the aerodynamic drag of the airframe.

The overlap splices shown in FIGS. 1 and 2 have an eccentricity in load path between the inner and outer skins. This causes them to bend out of plane as the load is applied. An alternative prior art splice design to eliminate this bending is shown in the butt splice of FIG. 3, in which the adjacent skin panels 21 and 23 are butted together at 25 and spliced by the flange of the longeron 27, the external longitudinal strap 29, and the internal fingered splice plate 31. Since there is no direct connection between the skins, the load is transferred from one skin to the splice straps and back into the other skin at the opposite end of the joint. This design enables the skins to be safely operated at higher stress levels than with the lap splices shown in FIGS. 1 and 2, but requires almost twice as many fasteners. This design also uses fingers on the thin inner splice plate 31 both to reduce the fastener loads at the outermost full rows of fasteners and to increase the inspection intervals by permitting longer cracks to grow between the more widely spaced partial outermost rows.

It is an object of the present invention to provide an improved skin lap splice for aircraft.

Another object is to provide an improved fuselage skin lap splice for aircraft with respect to the prior art splice shown in FIG. 2, by reducing the load transfer on the most critical row of fasteners connecting the outer and inner skins of the splice, and thereby reducing metal fatigue.

A still further object is to provide an improved fuselage skin lap splice which is simpler in construction and formed of fewer components than the prior art lap splice of FIG. 1, and requiring fewer fasteners than the prior art butt splice of FIG. 3, while providing the same advantages from the finger doublers, namely reduced load transfer and bearing stress at the most critical fastener holes in the skins at the splice.

SUMMARY OF THE INVENTION

According to the invention, it has been found that the separate finger doublers shown at 16 and 18 in FIG. 1, can be combined and integrated directly into the inner skin of the skin lap splice, as a part thereof, rather than as an additional member as shown in FIG. 1. The integral doubler reduces the shear load and bearing stress on the critical row of fasteners in the prior art splice shown without doublers in FIG. 2, while also achieving the greater fatigue life comparable to the joint illustrated in FIG. 1 showing the lap splice with separate finger doublers. This is described in greater detail hereinafter.

The inner doubler 18 shown in FIG. 1 would not be needed to reinforce the inner skin 14 unless the inner skin were thinner than the outer skin 12. Otherwise, the weight of the inner doubler 18 would be better spent increasing the overlap between the rows of fastener rows 20 and 22 in the outer skin 12, with a matching change between rows 32 and 34 in the inner skin 14. Such an increase in overlap would decrease the effects of the eccentricity in load path by spreading it over a greater distance, a feature which is inherent in the present invention which would typically use five rows of fasteners to replace the three in FIG. 2.

Further, the integration of the finger doubler into the edge of the inner skin with the skin lap splice of the present invention reduces the number of parts needing to be fabricated and properly located.

Particularly when employing automatic riveting, the simpler lap splice hereof can be assembled much more readily than the lap splice of FIG. 1, and in addition the lap splice hereof generally requires substantially fewer fasteners for assembly than the butt splice of FIG. 3, due to transfer of the load directly from one skin to the other.

As a further feature of the present invention, the outwardly extending fingers integrated with the inner skin are lollipopped, that is have a plurality of protrusions thereon which are attached by rivets to the outer skin. Such lollipopping renders the fingers at the ends of the inner skin more flexible and softens the load transfer through the fasteners from one skin to the other at the end of the splice where the fingers are located.

The aforementioned flexibility could alternatively be achieved by extensive perforations (holes) near the edge of the inner skin as described in greater detail hereinafter, rather than by distinct recognizable fingers.

In a broad sense, the present invention accordingly can be defined as a skin lap splice, particularly a fuselage longitudinal splice, between adjacent skin panels of aircraft, which comprises an outer skin having a longitudinal edge portion and an inner skin having a longitudinal edge portion, such edge portions being in contact and overlapping, a plurality of first longitudinal rows of rivets connecting said edge portions, a plurality of fingers integrally connected along the edge portion of said inner skin and extending outwards therefrom, and at least one second longitudinal row of rivets passing through said fingers and connecting said outer skin and said fingers. As a feature of the invention, such fingers are lollipopped and the spacing between the fasteners of the longitudinal row or rows of fasteners passing through the lollipopped fingers is greater, typically by a factor of two, than between the fasteners in each of the full longitudinal rows of fasteners connecting the adjacent edge portions of the outer and inner skins.

BRIEF DESCRIPTION OF THE DRAWINGS

The invention will be more clearly understood by reference to the description below taken in conjunction with the accompanying drawings wherein:

FIG. 2 illustrates in cross section another prior art longitudinal fuselage lap splice for aircraft, which is simpler than the splice shown in FIG. 1 but less durable;

FIG. 2a illustrates a local modification of the joint shown in FIG. 2, whereby the fatigue life is extended by using a single row of protruding-head fasteners to decrease the most critical bearing stress in an otherwise flush joint.

FIG. 3 illustrates a prior art longitudinal butt (double strap) splice for aircraft having a very long fatigue life, but many more fasteners than the joints in FIG. 1 and FIG. 2;

FIGS. 7 and 8 show other fastener arrangements which can achieve the same fastener load distribution as the splice in FIG. 4; and FIG. 9 is a modification of the skin lap splice of FIGS. 4 and 5, which illustrates how the flexibility at the end of the inner skin can be achieved by the provision of large holes rather than by discrete fingers.

DETAILED DESCRIPTION OF THE INVENTION AND PREFERRED EMBODIMENTS

Figure 6:
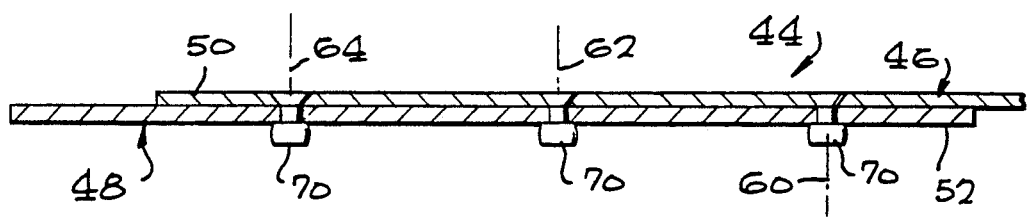
FIG. 6 is a transverse cross section taken on Line 6—6 of FIG. 5.
Figure 4:
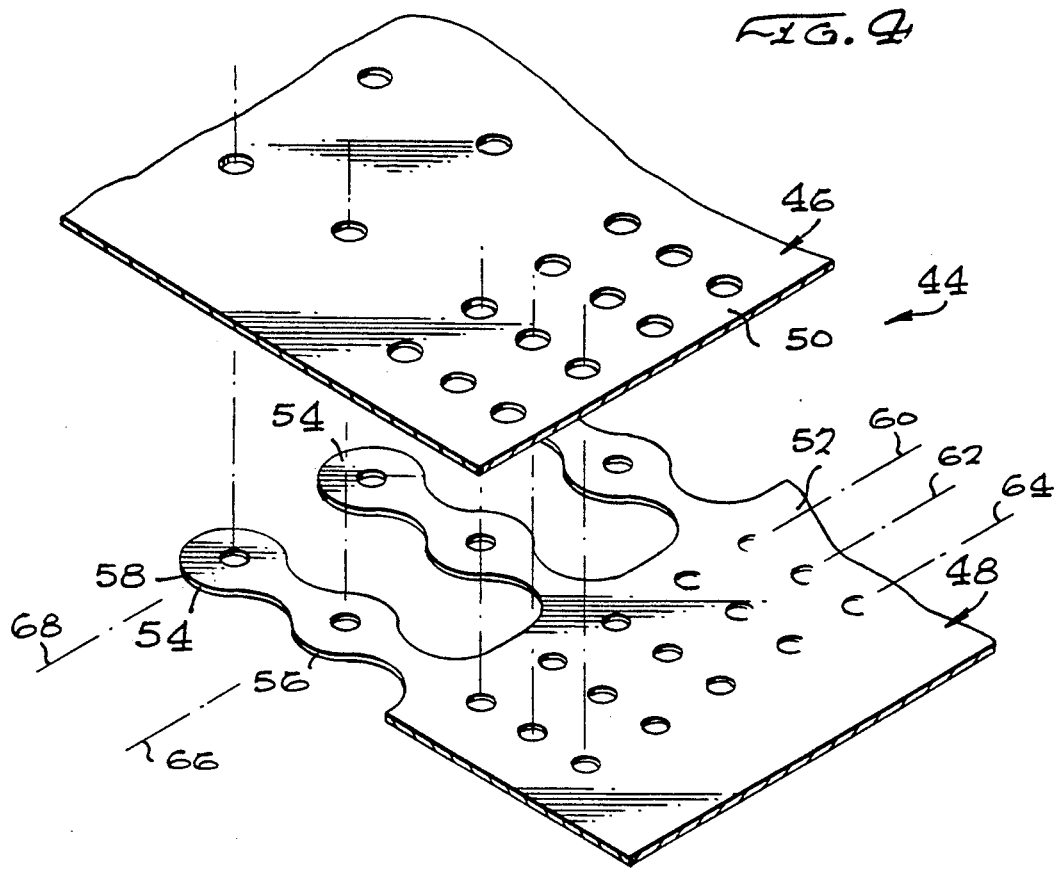
FIG. 4 is an exploded perspective of the improved fuselage skin lap splice of the invention.
Figure 5:
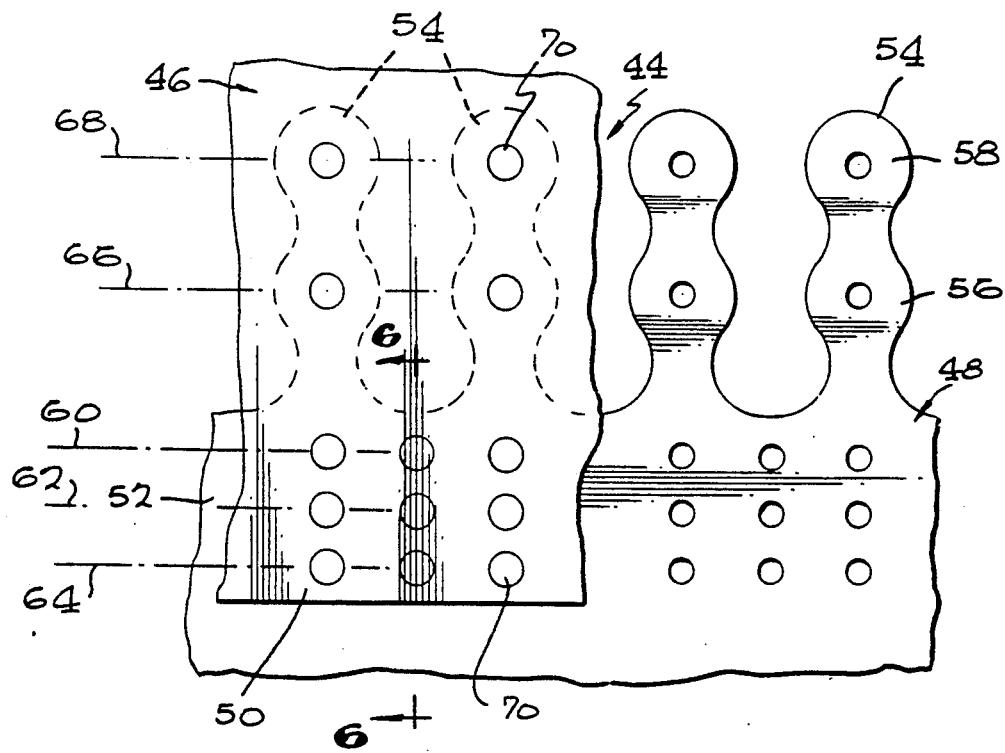
FIG. 5 is a plan view of the lap splice of FIG. 4 showing the rows of fasteners connecting the outer and inner skins of the lap splice.

Referring to FIGS. 4 to 6 of the drawings, numeral 44 illustrates the improved fuselage skin lap splice of the invention which comprises an outer skin 46 and an inner skin 48 having overlapping edge portions 50 and 52, respectively, in contact with each other, as seen in FIGS. 5 and 6. The skins 46 and 48 can be a metal such as aluminum, titanium, or alloys of aluminum or titanium, or steel. They can also be made from plastic or from fiber-polymer, or metal-matrix composites. Composite materials normally consist of strong, stiff fibers which carry most of the load in a softer matrix which supports the fibers and enables the load to be transferred into or out of the fibers.

The inner skin 48 has a plurality of fingers 54 extending outwardly from the edge portion 52. Such fingers 54 are substantially equally spaced longitudinally along the edge portion 52 of the inner skin. In the embodiment shown, the fingers 54 are lollipopped, that is each of such fingers has two protrusions or lollipops 56 and 58 thereon.

The adjacent skins are connected at their edge portions 50 and 52 in the overlap splice of the invention, by three longitudinal rows of rivets 60, 62 and 64. The outer skin is also connected to the fingers 54 of the inner skin by two longitudinal rows of rivets 66 and 68. The rivets in each of rows 60, 62 and 64 are equally spaced, and the rivets in each of rows 66 and 68 are equally spaced a distance of about twice the distance between the rivets in rows 60, 62 and 64. The adjacent rivets in all of the rows of rivets 60, 62, 64, 66 and 68 are shown in transverse alignment, in FIG. 5, but could also be displaced as in FIG. 7 so that the rivets of rows 66 and 68 could lie between the transverse columns of rivets in rows 60, 62 and 64 by about half a rivet pitch instead of being aligned with them. Likewise, as shown in FIG. 8, the rivets in row 62 are sometimes displaced longitudinally by half a rivet pitch with respect to those in rows 60 and 64.

It will be seen that since the distance between the adjacent rivets in rivet rows 66 and 68, is twice that between adjacent rivets in rivet rows 60, 62 and 64, only half the number of rivets in longitudinal rows 66 and 68 passing through the fingers 54 are employed, as compared to the number of rivets in each of the longitudinal rows 60, 62 and 64. The reason for this increased spacing between the rivets in rows 66 and 68 is that any skin cracks, which would start growing at row 66 or 68 in the outer skin could safely grow longer and be easier to detect than if permitted to grow at row 60, as would be the case if there were no fingers attached to the inner skin. Lengthening the overlap from between rows 64 and 60 to between rows 64 and 68 also reduces the skin bending stresses due to the eccentricity in load path between the inner and outer skins. Viewing particularly FIG. 6, the rivets 70 employed in each of the rows of rivets, are usually flush or countersunk rivets and are generally formed of a metal such as aluminum or titanium. Titanium or steel threaded fasteners could also be used. This provides a smooth low-drag outer skin surface uninterrupted by the protruding rivet heads, as shown at 11 in FIG. 2.

It will be noted that the longitudinal row of rivets 60 in the outer skin 46 adjacent to the inner edge 52 of inner skin 48 is critical, in the absence of the fingers 54. That is, high load transfer would occur at such row of rivets 60 from one skin to the other, resulting in high bearing stresses transferred at such rivets in the absence of fingers 54. This high load transfer is aggravated by the countersunk rivet heads; the rivets in row 64 at the other end of the joint do not create such a problem for the inner skin 48 which is not countersunk. The countersunk holes in the outer skin at rivet row 64 are even less critical, because of the decrease in skin stress via the loads transferred by the rivets in rows 60 and 62. Without the lollipopped fingers, the most critical location would always be in the outer skin at rivet row 60 because that is where the maximum skin stress is combined with the maximum bearing stress on the parallel shank of the rivet. Without the lollipopped fingers, typically some 40 percent of the total load transferred passes through each of the fastener rows 60 and 64, with barely 20 percent through the middle row 62. The addition of the lollipopped fingers would change that distribution to about 15 percent through partial row 68, 10 percent through partial row 66, 25 percent through full row 60, 15 percent through the middle full row 62 and 35 percent through the outer full row 64.

Thus, the lollipopped fingers 54 on the inner skin 48 softens the load transfer going through rivet row 60 because of the load transferred through the two partial rows of rivets 66 and 68 passing through fingers 54. This load transfer also decreases the remaining load in the outer skin at rivet row 60. The fingers thus reduce both the bearing stress and the bypass stress in the outer skin at rivet row 60, thereby prolonging the fatigue life of the joint.

A new critical location is established in the outer skin at rivet row 68, where the skin stress is highest. The flexibility of the fingers 54 at the end of the inner skin softens the load transfer and reduces the peak fastener load at such critical location. Such flexibility of fingers 54 must be sufficient that the individual fastener loads at row 68 will be less than would have been the case at row 60 without the fingers. For the example cited above, this reduction is from 40 percent of the total load to 30 percent per rivet. This distinguishes the improvement of the invention splice over the prior art splice shown in FIG. 2. Conversely, if the fingers were made too flexible by removing too much material from the end of the inner skin 48, rivet rows 66 and 68 would transfer so little load as to leave the outer skin 46 at rivet row 60 still the most critical location in the joint.

Thus, even though all of the rivets are countersunk, as shown in FIG. 6, making the skins susceptible to fatigue damage by high bearing stresses, lollipop fingers on the inner skin, with the right flexibility, can substantially decrease the critical fastener load that is transferred between the skins, thereby prolonging the fatigue life of the joint and creating a safer more easily inspected splice, by keeping the critical location in the visible outer skin while, at the same time, increasing the safe crack length between the more widely separated fasteners. This is a distinct improvement over the splice shown in FIG. 2a, for which half the cracks would be expected to occur in the inner skin and be concealed by the outer skin.

Figure 1:
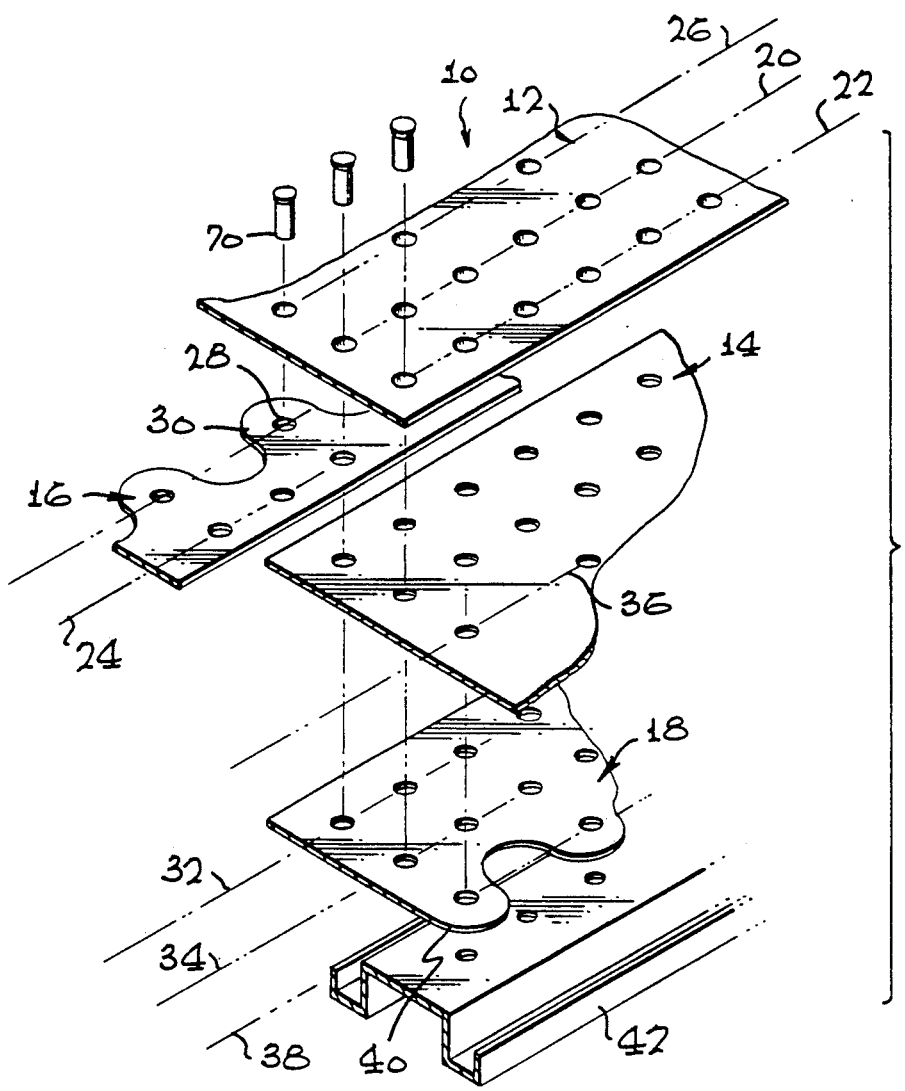
FIG. 1 illustrates a prior art longitudinal fuselage lap splice for an aircraft in which separate doublers are used to achieve a long fatigue life.

Further, the fuselage skin lap splice concept of the invention is particularly suited to automatic riveting since no separate splice doublers are required to be held in position during riveting, as compared to the lap splice of the prior art shown in FIG. 1 employing separate finger doublers. It is also significant that substantially fewer fasteners can be employed for the lap splice of the present invention as compared to the prior art butt splices incorporating additional internal and external splice straps, as shown in FIG. 3.

It will be understood that variations in the structure of the improved fuselage skin lap splice of the invention can be made. Thus, for example, the number of longitudinal rows of fasteners in the outer and inner skin portions can be varied, the number and spacing of the lollipop fingers on the inner skin can be varied, and the number and spacing of the lollipops or protrusions on each of the fingers can be varied to obtain the desired flexibility of the fingers. Some alternative arrangements are illustrated, for example in FIGS. 7 and 8.

The fuselage skin lap splice of the invention is particularly designed for use where both the outer and inner skins have approximately the same thickness. Where the thickness of the outer and inner skins is unequal, an additional lollipopped finger doubler such as illustrated in FIG. 1 can be included and disposed in contact with and adjacent to the thinner of the skins, such doubler being fastened to each of the skins.

While the invention device is particularly designed as a lap splice extending along the length of the fuselage, it can also be employed as a joint on a wing or a horizontal or vertical tail, or on a control surface.

Thus, according to the invention, by incorporating a flexible lollipopped end on the inner skin of the skin lap splice, the shear load that is transferred through the longitudinal row or rows of fasteners passing through the lollipopped end portion and through adjacent rows of fasteners is redistributed in such a way as to extend the fatigue life of the joint. Such redistribution of the shear load transfer and the associated reduction in peak bearing stress at the fasteners avoids the need to use unsightly and drag-producing protruding-head fasteners to reduce the bearing stresses. There is thus provided according to the invention an improved simplified and durable fuselage skin lap splice which is more readily and inexpensively assembled by incorporating the finger doubler of the prior art structures directly into the inner skin of the connection.

Since the key function of the lollipopped fingers at the ends of the inner skin is to provide the desired flexibility at the edge of the inner skin, such flexibility or flexibilizing means could alternatively be achieved by providing a skin lap splice, as illustrated in FIG. 9, by drilling a plurality of large open holes 74 of substantially the same diameter near the edge or end of the inner skin 76 of the lap splice 78 formed of the inner skin 76 and outer skin 80, rather than by the provision of fingers having apertures therebetween, as seen in FIGS. 4 and 5. As in the skin lap splice of FIGS. 4 and 5, the adjacent skins 76 and 80 are connected at their edge portions by three longitudinal rows of rivets 82, 84 and 86, and the outer skin is also connected to the inner skin by two longitudinal rows of rivets 88 and 90 passing through inner skin 76 between the holes 74 therein. The rivets in each of rows 82, 84 and 86 are equally spaced, and the rivets in each of rows 88 and 90 are equally spaced a distance of about twice the distance between the rivets in rows 82, 84 and 86. The adjacent rivets in all of the rows of rivets 82, 84, 86, 88 and 90 are in transverse alignment.

Since various further modifications of the invention will occur to those skilled in the art, the invention is not to be taken as limited except by the scope of the appended claims.

What is claimed is:

1. In a skin lap splice between adjacent skin panels of aircraft which comprises an outer skin having a longitudinal edge portion and an inner skin having a longitudinal edge portion, said edge portions being in contact and overlapping, and a plurality of first longitudinal rows of fasteners connecting said edge portions; the improvement which comprises means on said inner skin adjacent the longitudinal edge portion thereof and forming a part of said inner skin to provide flexibility at said longitudinal edge portion of said inner skin, and at least one second longitudinal row of fasteners passing through said flexibilizing means and connecting the longitudinal edge portion of said outer skin and the longitudinal edge portion of said inner skin.

2. The ski lap splice of claim 1, wherein said inner and outer skins are metal.

3. The skin lap splice of claim 1, wherein said inner and outer skins are composite.

4. A skin lap splice between adjacent skin panels of aircraft which coprises an outer skin having a longitudinal edge portion and an inner skin having a longitudinal edge portion, said edge portions being in contact and overlapping, a plurality of first longitudinal rows of fasteners connecting said edge portions, a plurality of fingers on said inner skin along said edge portion of said inner skin, forming a part thereof and extending outwardly therefrom, and at least one second longitudinal row of fasteners passing through said fingers and connecting said outer skin and said fingers.

5. The skin lap splice of claim 4, wherein said fingers are lollipopped and wherein the spacing of fasteners in said at least one second longitudinal row of fasteners passing through said lollipopped fingers is greater than between the fasteners in each of said first longitudinal rows of fasteners connecting said edge portions.

6. The skin lap splice of claim 4, wherein the thickness of said outer and inner skins is approximately equal.

7. A skin lap splice between adjacent skin panels of aircraft which comprises an outer skin having a longitudinal edge portion and an inner skin having a longitudinal edge portion, said edge portions being in contact and overlapping, a plurality of first longitudinal rows of fasteners connecting said edge portions, a plurality of holes along the outer edge of the longitudinal edge portion of said inner skin, and at least one second longitudinal row of fasteners passing through said inner skin between said holes and connected to said outer skin.

8. The skin lap splice of claim 7, wherein there are three said first longitudinal rows of fasteners connecting said edge portions, said holes being spaced apart a distance such that the number of fasteners in said at least one second longitudinal row of fasteners is approximately half the number of fasteners in each row of said three first longitudinal rows.

9. The skin lap splice of claim 8, wherein there are two said second longitudinal rows of fasteners passing through said inner skin between said holes.

10. The skin lap splice of claim 9, wherein the adjacent fasteners in all of said longitudinal rows of fasteners are substantially in transverse alignment.

11. The skin lap splice of claim 7, wherein said holes are of substantially the same diameter.

12. The skin lap splice of claim 7, wherein the thickness of said outer and inner skins is approximately equal.

13. A skin lap splice between adjacent skin panels of aircraft and particularly adapted as an aircraft fuselage skin lap splice, which comprises an outer skin having a longitudinal edge portion and an inner skin having a longitudinal edge portion, said edge portions being in contact and overlapping, a plurality of first longitudinal rows of fasteners connecting said edge portions, a plurality of lollipopped fingers integrally connected along said edge portion of said inner skin and extending outwardly therefrom, and at least one second longitudinal row of fasteners passing through said fingers and connecting said outer skin and said fingers, and wherein there are three said first longitudinal rows of fasteners connecting said edge portions, said lollipopped fingers being spaced apart from each other a distance such that the number of fasteners in said at least one longitudinal row of fasteners passing through said lollipopped fingers is approximately half the number of fasteners in row of said three longitudinal rows of fasteners connecting said edge portions.

14. The skin lap splice of claim 13, wherein there are two said longitudinal rows of fasteners passing through said lollipopped fingers.

15. The skin lap splice of claim 14, wherein the fasteners in each of said three first longitudinal rows of fasteners are substantially equally spaced, and the fasteners in each of the two longitudinal rows of fasteners passing through said lollipopped fingers are substantially equally spaced a distance approximately twice the distance between the fasteners in said three first longitudinal rows of fasteners connecting said edge portions, and the adjacent fasteners in all of said longitudinal rows of fasteners are substantially in transverse alignment.

16. The skin lap splice of claim 15, wherein the thickness of said outer and inner skins is unequal, and including a lollipopped finger doubler disposed in contact with and adjacent to the thinner of said skins, said doubler being fastened to each of said skins.

17. The skin lap splice of claim 14, wherein the fasteners in each of said three first longitudinal rows of fasteners are substantially equally spaced, and the fasteners in each of the two longitudinal rows of fasteners passing through said lollipopped fingers are substantially equally spaced a distance approximately twice the distance between the fasteners in said three first longitudinal rows of fasteners connecting said edge portions, and the adjacent fasteners in each of the two longitudinal rows of fasteners passing through said lollipopped fingers is displaced laterally by about half a fastener pitch between the fasteners in each of said three first longitudinal rows of fasteners.

18. The skin lap splice of claim 13, wherein the fasteners in each of said three first longitudinal rows of fasteners are substantially equally spaced and the adjacent fasteners in each of said rows of fasteners are substantially in transverse alignment.

19. The skin lap splice of claim 13, wherein the fasteners in the middle row of said three first longitudinal rows of fasteners are displaced longitudinally about half the fastener pitch between the fasteners in each of the other said first longitudinal rows.

20. A skin lap splice between adjacent skin panels of aircraft which comprises an outer skin having a longitudinal edge portion and an inner skin having a longitudinal edge portion, said edge portions being in contact and overlapping, a plurality of first longitudinal rows of fasteners connecting said edge portions, a plurality of lollipopped fingers integrally connected along said edge portion of said inner skin and extending outwardly therefrom, and at least one second longitudinal row of fasteners passing through said fingers and connecting said outer skin and said fingers, and wherein the spacing of fasteners in said at least one second longitudinal row of fasteners passing through said lollipopped fingers is greater than between the fasteners in each of said first longitudinal rows of fasteners connecting said edge portions, and wherein the thickness of said outer and inner skins is unequal, and including an additional lollipopped finger doubler disposed in contact with said adjacent to the thinner of said skins, said doubler being fastened to each of said skins.

* * * * *